US009503344B2

(12) United States Patent
Chakrabarti et al.

(10) Patent No.: US 9,503,344 B2
(45) Date of Patent: Nov. 22, 2016

(54) DATA PATH PERFORMANCE MEASUREMENT USING NETWORK TRAFFIC IN A SOFTWARE DEFINED NETWORK

(71) Applicant: Telefonaktiebolaget L M Ericsson (publ), Stockholm (SE)

(72) Inventors: Samita Chakrabarti, Sunnyvale, CA (US); Alexander Bachmutsky, Sunnyvale, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 188 days.

(21) Appl. No.: 14/341,761

(22) Filed: Jul. 25, 2014

(65) Prior Publication Data

US 2016/0028604 A1    Jan. 28, 2016

(51) Int. Cl.
*H04L 12/26* (2006.01)
(52) U.S. Cl.
CPC ....... *H04L 43/0852* (2013.01); *H04L 43/0858* (2013.01); *H04L 43/106* (2013.01); *H04L 43/50* (2013.01)
(58) Field of Classification Search
None
See application file for complete search history.

(56) References Cited

U.S. PATENT DOCUMENTS

| | | | | |
|---|---|---|---|---|
| 6,560,648 B1 * | 5/2003 | Dunn | ................. | H04L 12/2697 709/223 |
| 8,665,746 B2 * | 3/2014 | Mack-Crane | ....... | H04L 43/0888 370/253 |
| 9,148,354 B2 * | 9/2015 | Johnsson | ............ | H04L 41/5038 |
| 2006/0285501 A1 * | 12/2006 | Damm | ................. | H04L 41/142 370/252 |

(Continued)

FOREIGN PATENT DOCUMENTS

CN    103765823 A    4/2014

OTHER PUBLICATIONS

Gardikis, et al., "An SNMP Agent for Active In-network Measurements," IV International Congress on Ultra Modem Telecommunications and Control Systems (ICUMT), IEEE, Oct. 3, 2012, pp. 302-307.

(Continued)

*Primary Examiner* — Donald Mills
(74) *Attorney, Agent, or Firm* — Nicholson De Vos Webster & Elliott, LLP

(57) ABSTRACT

A method in a network controller of a control plane in a software defined network (SDN) coupled to a plurality of network elements (NEs) of a data plane in the SDN is described. The method includes sending a first control message having content including a first set of one or more classification rules to an ingress NE of the plurality of NEs; sending a second control message having content including a second set of one or more classification rules to an egress NE of the plurality of NEs; receiving the second notification (Continued)

message from the egress NE responsive to the selected data packet having been received by the ingress NE from an upstream NE and forwarded through the SDN from the ingress NE toward the egress NE; and calculating an indication of a delay of the selected data packet between the ingress NE and the egress NE.

30 Claims, 6 Drawing Sheets

(56) References Cited

U.S. PATENT DOCUMENTS

| | | | |
|---|---|---|---|
| 2008/0117829 A1* | 5/2008 | Nakano | H04L 12/2697 370/247 |
| 2012/0124606 A1* | 5/2012 | Tidwell | H04N 21/25833 725/17 |
| 2013/0088977 A1* | 4/2013 | Baillargeon | H04L 12/4633 370/251 |
| 2013/0117434 A1* | 5/2013 | Chakrabarti | H04L 45/70 709/224 |
| 2014/0016474 A1 | 1/2014 | Beheshti-Zavareh et al. | |
| 2014/0092736 A1 | 4/2014 | Baillargeon | |

OTHER PUBLICATIONS

IEEE Standard for a Precision Clock Synchronization Protocol for Networked Measurement and Control Systems; IEEE Instrumentation and Measurement Society; IEEE Std. 1588-2008; IEEE 3 Park Avenue, New York, NY 10016-5997; Jul. 24, 2008; 289pgs.
"Media Access Control (MAC) Bridges and Virtual Bridge Local Area Networks", IEEE Standards Association; IEEE Computer Society; IEEE Std 802.1Q-2011; IEEE 3 Park Avenue, New York, NY 10016-5997; Aug. 31, 2011; 1365pgs. 'http://standards.ieee.org/getieee802/download/802.1Q-2011.pdf'.
Postel, J., "User Datagram Protocol," Aug. 28, 1980; 3 pages; RFC 768.
Deering, S. et al., "Internet Protocol," Version 6 (IPv6) Specification, Network Working Group; RFC 2460; Dec. 1998; 39 pages.
Borman, D. et al., "IPv6 Jumbograms," Network Working Group; RFC 2675; Aug. 1999; 9 pages.
Fenner, B. et al. "Management Information Base for the User Datagram Protocol (UDP)," Network Working Group; RFC 4113; Jun. 2005; 19 pages.
Eggert, L., et al. "Unicast UDP Usage guidelines for Application Designers," Network Working Group; RFC 5405; Nov. 2008; 27 pages.
Postel, J., "Transmission Control Protocol," STD 7, RFC 793, Internet Standard; Sep. 1981; 91 pages.
Socolofsky, T. et al., "A TCP/IP Tutorial," Network Working Group; RFC 1180; Jan. 1991; 28 pages.
Nichols, K. et al., "Definition of the Differentiated Services Field (DS Field) in the IPv4 and IPv6 Headers," Network Working Group; RFC 2474; Dec. 1998; 20 pages.
Blake, S. et al., "An Architecture for Differentiated Services," Network Working Group; RFC 2475; Dec. 1998; 36 pages.
Heinanen, J. et al., "Assured Forwarding PHB Group," Network Working Group; RFC 2597; Jun. 1999; 11 pages.
Black, D. "Differentiated Services and Tunnels," Network Working Group; RFC 2983; Oct. 2000; 14 pages.
Nichols, K. et al. "Definition of Differentiated Services Per Domain Behaviors and Rules for their Specification," Network Working Group; RFC 3086; Apr. 2001; 24 pages.
Black, D. et al., "Per Hop Behavior Identification Codes," Network Working Group; RFC 3140; Jun. 2001; 8 pages.
Davie, B. et al., "An Expedited Forwarding PHB (Per-Hop Behavior)," Network Working Group; RFC 3246; Copyright The Internet Society (2001); Mar. 2002; 16pgs.
Gardikis, et al., "An SNMP Agent for Active In-network Measurements," IV International Congress on Ultra Modern Telecommunications and Control Systems (ICUMT), IEEE, Oct. 3, 2012, pp. 302-307.
Grossman, D. "New Terminology and Clarifications for Diffserv," Network Working Group; RFC 3260; Apr. 2002; 10 pages.
Babiarz, J. et al., "Configuration Guidelines for DiffServ Service Classes," Network Working Group; RFC 4594; Aug. 2006; 57 pages.
Baker, F. et al., "A Differentiated Services Code Point (DSCP) for Capacity-Admitted Traffic," Internet Engineering Task Force (IETF); RFC 5865; May 2010; 14 pages.
Baker, F. et al., "Management Information Base for the Differentiated Services Architecture," Network Working Group; RFC 3289; Copyright The Internet Society (2002). May 2002; 116pgs.
Bernet, Y. et al., "An Informal Management Model for Diffsery Routers," Network Working Group; RFC 3290; May 2002; 56 pages.
Chan, K. et al., "Differentiated Services Quality of Service Policy Information Base," Network Working Group; RFC 3317; Mar. 2003; 96 pages.
Hedayat, K. et al., "*A Two-Way Active Measurement Protocol (TWAMP)*," Network Working Group; RFC: 5357' Oct. 2008; 26pgs.
Morton, A. et al., "*Mixed Security Mode for the Two-Way Active Measurement Protocol (TWAMP)*," Network Working Group; RFC: 5618; Updates: 5357; Aug. 2009; 8pgs.
Morton, A. et al., "Individual Session Control Feature for the Two-Way Active Measurement Protocol (TWAMP)," IETF; RFC: 5938; Updates: 5357; Aug. 2010; 17pgs.
Morton, A. et al., "*Two-Way Active Measurement Protocol (TWAMP) Reflect Octets and Symmetrical Size Features*," IETF; RFC: 6038; Updates: 5357; Oct. 2010; 18pgs.
Shalunov, S. et al., "*A One-Way Active Measurement Protocol (OWAMP)*," Network Working Group; RFC: 4656; Sep. 2006; 56pgs.
Hanks, S., et al., "*Generic Routing Encapsulation (GRE)*," Network Working Group; RFC: 1701; Oct. 1994; 8pgs.
Hanks, S., et al., "*Generic Routing Encapsulation over IPv4 networks*," Network Working Group; RFC: 1702; Oct. 1994; 4pgs.
Farinacci, D. et al., "*Generic Routing Encapsulation (GRE)*," Network Working Group; RFC: 2784' Mar. 2000; 9pgs.
Dommety, G. et al., "*Key and Sequence Number Extensions to GRE*," Network_Working Group; RFC: 2890; Sep. 2000; 7pgs.
"OpenFlow Switch Specification," Feb. 28, 2011; 56pgs; Version 1.1.0 Implemented (Wire Protocol 0x02); downloaded from 'http://www.openflow.org/documents/openflow-spec-v1.1.0.pdf' on Sep. 26, 2011.
U.S. Appl. No. 14/341,760, "Non-Final Office Action," mailed Feb. 26, 2016, 14 pages.
U.S. Appl. No. 14/341,760, "Final Office Action," mailed Jun. 3, 2016, 14 pages.

* cited by examiner

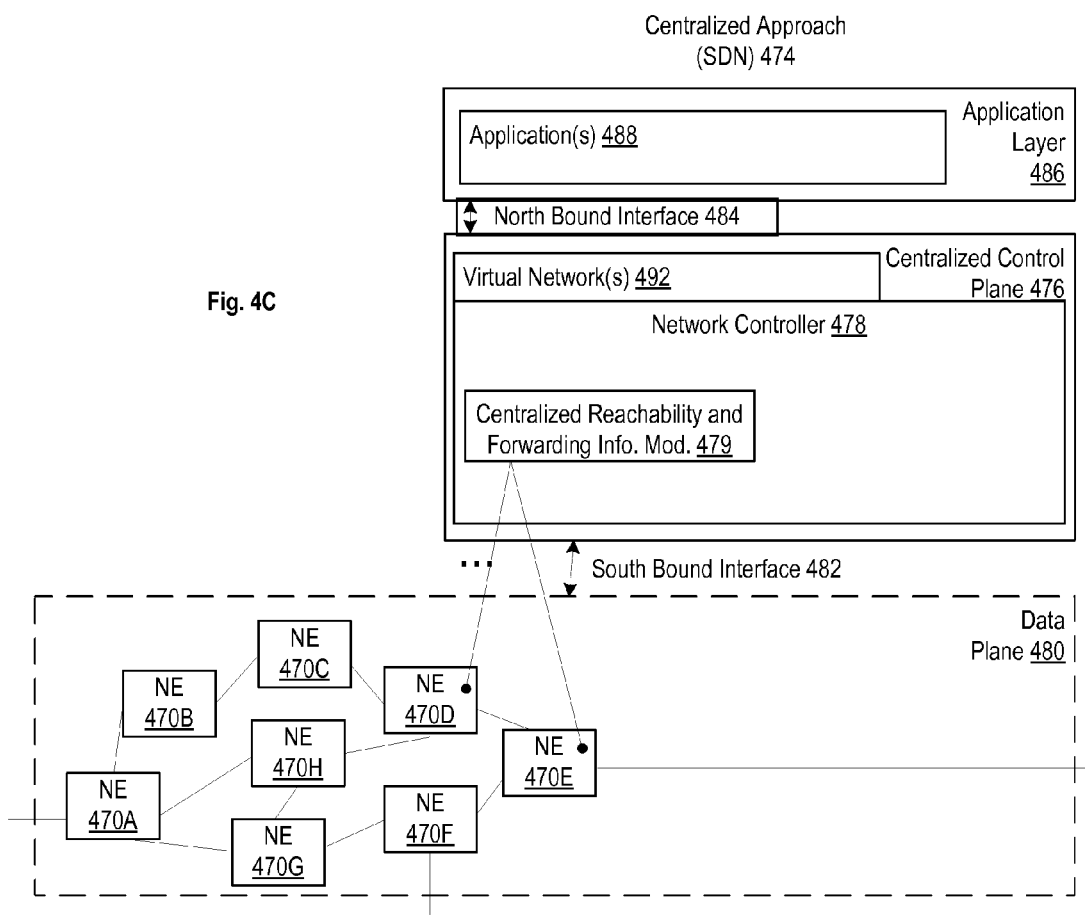

US 9,503,344 B2

DATA PATH PERFORMANCE MEASUREMENT USING NETWORK TRAFFIC IN A SOFTWARE DEFINED NETWORK

FIELD

Embodiments of the invention relate to the field of software-defined networking (SDN); and more specifically, to data path performance measurement using network traffic in a software defined network.

BACKGROUND

A software defined network (SDN) is a network where the components of the network traditionally known as the control plane and the data plane may be separated into different physical devices. One or more control plane devices may communicate with one or more data plane devices on the network via a special purpose SDN protocol. The communications between the control plane devices and the data plane devices may be bi-directional, and may involve the control plane devices configuring the forwarding table of the data plane devices, and the data plane devices sending information about traffic to the control plane devices. In some cases, such an arrangement allows for a network with few control plane devices and many data plane devices, instead of a traditional network with many devices that include both a control plane and a data plane. This may decrease costs and simplify administration of the software defined network.

SUMMARY

According to some embodiments of the invention, a method in a network controller of a control plane in a software defined network (SDN) coupled to a plurality of network elements (NEs) of a data plane in the SDN is described. The method includes sending a first control message having content including a first set of one or more classification rules to an ingress NE of the plurality of NEs, wherein the content of the first control message instructs the ingress NE to select a data packet that matches the first set of classification rules, to modify that selected data packet to include a packet identifier, and to forward the selected data packet, and wherein the ingress NE is a first edge NE within the SDN.

The method further includes sending a second control message having content including a second set of one or more classification rules to an egress NE of the plurality of NEs, wherein the content of the second control message instructs the egress NE to respond to receipt of the selected data packet with the packet identifier with transmission of a second notification message to the network controller and with removal of the modifications including the packet identifier from the selected data packet, wherein the egress NE is a second edge NE within the SDN. The method further includes receiving by the network controller the second notification message from the egress NE responsive to the selected data packet having been received by the ingress NE from an upstream NE and forwarded through the SDN from the ingress NE toward the egress NE, wherein the second notification message includes at least the packet identifier of the selected data packet and a second received timestamp indicating the time when the egress NE received the selected data packet. The method further includes calculating an indication of a delay of the selected data packet between the ingress NE and the egress NE based on a difference in time between a first received timestamp and the second received timestamp, wherein the first received timestamp indicates the time when the ingress NE received the selected data packet.

According to some embodiments, the first control message sent to the ingress NE further causes the ingress NE to transmit to the network controller a first notification message having the packet identifier and the first received timestamp.

According to some embodiments, the first control message sent to the ingress NE further causes the ingress NE to modify the selected data packet to include the first received timestamp, and wherein the second control message transmitted to the egress NE further causes the egress NE to include the first received timestamp in the second notification message.

According to some embodiments, the first set of classification rules are based on learned traffic patterns. According to some embodiments, the first set of classification rules specify a rate at which to select incoming data packets. According to some embodiments, the second set of classification rules specify criteria by which the egress NE uses to recognize the selected data packet.

According to some embodiments, the packet identifier includes a path identifier that identifies the path that the selected data packet takes through the SDN. According to some embodiments, the packet identifier includes a packet sequence number to uniquely identify the selected data packet.

According to some embodiments, the modification of the data packet does not affect the path the selected data packet takes through the SDN. According to some embodiments, the modification of the selected data packet includes encapsulating the selected data packet in a tunnel, wherein a first tunnel end point is the source address identified in the selected data packet, and wherein a second tunnel end point is the destination address identified in the selected data packet.

Thus, embodiments of the invention include a method for data path performance measurement using network traffic in a software defined network.

BRIEF DESCRIPTION OF THE DRAWINGS

The invention may best be understood by referring to the following description and accompanying drawings that are used to illustrate embodiments of the invention. In the drawings:

FIG. 4C illustrates a network with a single network element (NE) on each of the NDs of FIG. 4A, and within this straight forward approach contrasts a traditional distributed approach (commonly used by traditional routers) with a centralized approach for maintaining reachability and forwarding information (also called network control), according to some embodiments of the invention.

DESCRIPTION OF EMBODIMENTS

Figure 1:
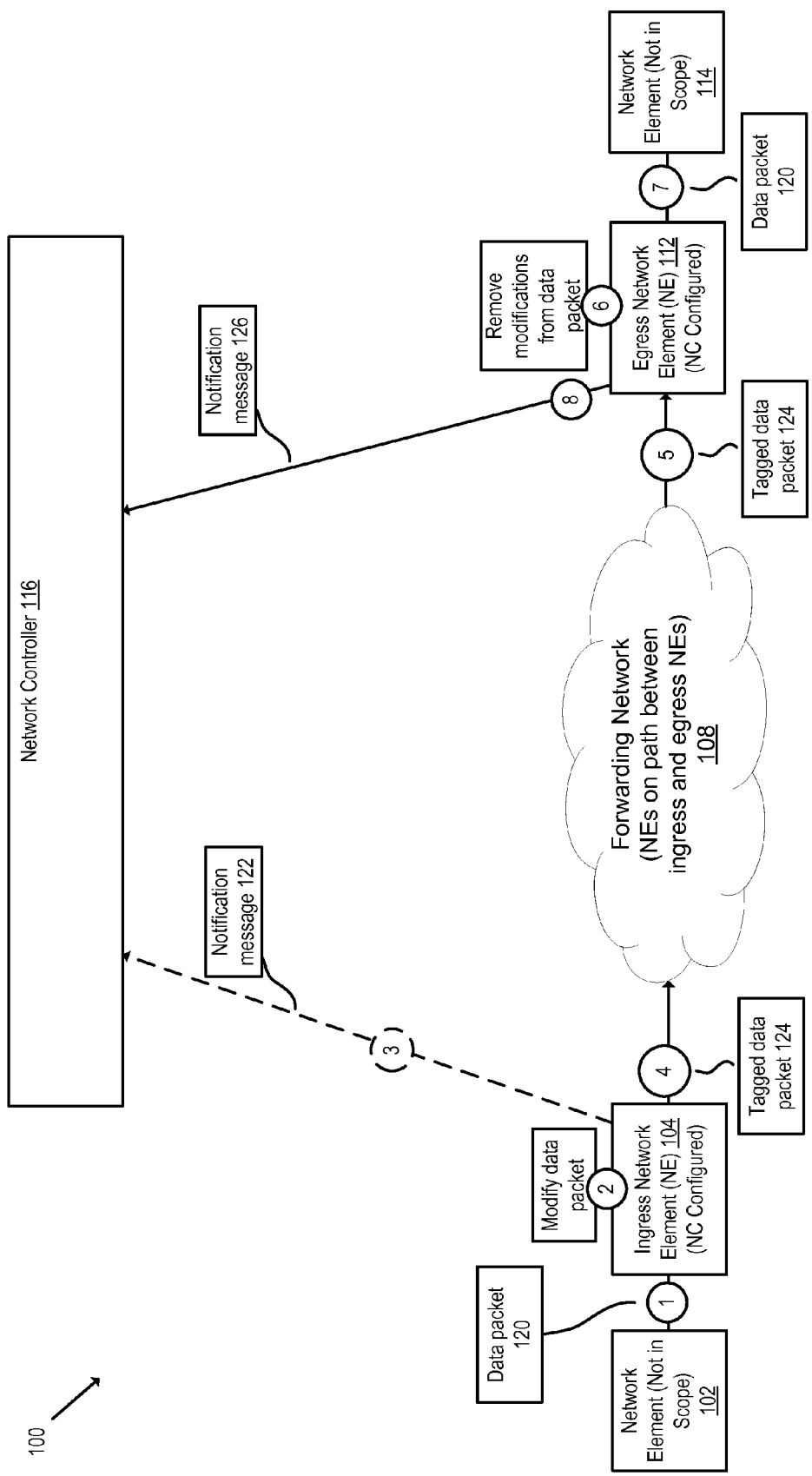
FIG. 1 illustrates a method in a system 100 for data path performance measurement using network traffic according to an embodiment of the invention.

The following description describes methods and apparatuses for data path performance measurement using network traffic. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code) and/or data using machine-readable media, such as non-transitory machine-readable media (e.g., machine-readable storage media such as magnetic disks, optical disks, read only memory, flash memory devices, phase change memory) and transitory machine-readable transmission media (e.g., electrical, optical, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set or one or more physical network interface(s) to establish network connections (to transmit code and/or data using propagating signals). One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

FIG. 1 is a block diagram illustrating a system 100 for performing SDN-controlled data path performance measurement according to an embodiment of the invention. In FIG. 1, the circled numbers denote transactions performed by the elements in the system. The sequence/order of the transactions in FIG. 1 is shown for illustrative purposes, and not intended to be limitations of the present invention.

System 100 includes a software-defined network (SDN) represented by network controller 116 and network elements (NEs) 104-112 along with the NEs within forwarding network 108. In an SDN, the functionalities associated with the control plane and the data plane of a traditional network device are decoupled. In the illustrated embodiment, the control plane resides in the network controller 116 and the data plane resides in the NEs of the SDN. The control plane device in the SDN communicates with the data plane devices using an SDN communications protocol (e.g. OpenFlow; defined by the Open Networking Foundation). The structure of the SDN is described in further detail in reference to FIGS. 4A, 4B, 4C, and 5.

An SDN network provides a network administrator with a centrally managed control plane (e.g., the network controller 116) and may simplify management and reduce costs. The link between the control plane element and data plane elements may have increased latency and latency variation (jitter) as it is a network link. This additional latency may cause issues if an administrator wishes to measure the network performance between data plane elements.

Although the depicted embodiment in system 100 includes NEs 104, 112, and the NEs in forwarding network 108, it shall be understood that system 100 may include more or less NEs or multitude of network controllers that may communicate with each other in partial mesh, full mesh or hierarchical structure, etc.

System 100 includes network element 102 and network element 114. These represent network elements that may be controlled or not controlled by the network controller 116 and may be network elements that are part of other networks. In some embodiments, these NEs 102 and 114 are outside a scope defined by the network controller for measuring performance metrics along one or more paths that are between but not inclusive of NEs 102 and 114. Such a scope may change depending on the performance measurement of a particular data path that is desired by an administrator or other entity that configures the network controller. In some embodiments, the NE's 104 and 112 reside on the edge of the depicted SDN as they are the edge NEs that are coupled with the NEs 102 and 114 that exist outside the SDN.

Referring to FIG. 1, the network controller 116 configures the ingress NE 104 to modify certain data packets that are part of normal traffic with identifying information in order to measure performance in the network. The network controller 116 also configures the egress NE 112 to identify these modified packets and notify the network controller 116 when the egress NE 112 receives a modified packet. In some embodiments, the egress NE 112 notifies the network controller 116 using an One Way Active Measurement Protocol (OW AMP) Control message. In some embodiments, the configuration information is sent to the ingress and egress NEs using Two Way Active Measurement Protocol (TW AMP) Control messages with a newly defined mode. In some embodiments, the configuration information is sent to the ingress and egress NEs using OW AMP-Control messages. In some embodiments, the content of the configuration information or control messages that are sent to the NEs include instructions that cause the NEs to perform the actions specified. In some embodiments, the configuration information is sent to the ingress and egress NEs using SDN communications protocol messages (e.g., OpenFlow).

TW AMP (IETF RFCs 5357, 5618, 5938, 6038; incorporated here by reference) defines a measurement protocol based on (OW AMP; IETF RFC 4656; incorporated here by reference). While OW AMP defines a method of measuring one way performance metrics (e.g., delay) between a sender and receiver NE, TW AMP defines a method of measuring round trip performance metrics between a sender and reflector NE. Both protocols define control and test messages. Control messages are used to set up test sessions for performance measurement. These control messages allow the NEs involved in the performance measurement to set up one or more test sessions, and allow the NEs to negotiate a mode of performance testing (e.g., encrypted communications testing, authenticated testing). Test messages are used between the NEs involved in the test to accomplish the actual performance measurement. In OW AMP, the sender NE may send a test message toward the receiver NE. This test message may include a timestamp indicating when the test message was sent. When the receiver NE receives this test message, it may create a timestamp associated with this received test message indicating when the test message was received. A client may later retrieve this information from the receiver NE. This client may retrieve this information using a control message. In TW AMP, the sender NE may send a test message toward the reflector NE that includes a timestamp indicating when the sender NE sent the test message. Upon receiving the test message, the reflector NE may send a reply test message toward the sender NE, and may include in the reply message the timestamp indicating when the sender NE sent the test message, a timestamp indicating when the reflector NE received the test message, and a timestamp indicating when the reflector NE sent the reply message. Using this timestamp information, a client, network element, server, or other device may calculate various performance metrics (e.g., delay, jitter) regarding the path taken by the test message through the network.

The network controller 116 configures the ingress NE 104 to modify or "tag" certain incoming data packets that match one or more classification rules (i.e., a classification policy). In some embodiments, these classification rule(s) are used by the ingress NE to match or recognize data packet(s) by 1) selecting specific packets that are expected to arrive through ingress NE 104 (e.g., a rule identifies a unique ping packet that a third party has agreed to send into the network); 2) selecting data packets based on the class of service (e.g., high priority, low priority) and/or latency class given to the packet; 3) selecting data packets that are part of a selected flow, where the network controller 116 identifies the selected flow based on per-flow statistics (e.g., network controller identifies flows that send bursty traffic and configures the ingress NE to tag packets in these flows); and/or by 4) selecting data packets that are part of critical packet patterns, where in some embodiments the network controller may identify these critical packet patterns by configuring one or more NEs to sample incoming data packets and to send these data packets to the network controller 116 (e.g., network controller identifies latency sensitive traffic through the sampling of packets at the NE(s) and configures classification rule(s) on the ingress NE to tag packets that are part of this traffic).

In some embodiments, the network controller 116 also configures the other NEs in an SDN so that certain packets are forwarded along a specific path within the SDN. Subsequently, the network controller 116 configures ingress NE 104 with one or more classification rules which are used to match those data packets that are forwarded along that specific path. In some embodiments, the network controller 116 configures the ingress NE 104 with one or more classification rules to select incoming data packets at a particular frequency (e.g., select every Nth packet), and may limit such selection to no more than a certain number of matches in a certain period of time (e.g., not more than M packets selected in time period T). In some embodiments such configurations may be achieved by throttling the traffic toward the Controller or by minimizing a number of packets that the Controller needs to process.

The network controller may also configure the ingress NE 104 to modify the matched data packet in a variety of ways. In some embodiments, the matched data packet is modified by 1) assigning the packet an Multiprotocol Label Switching (MPLS) label; 2) tagging the data packet with a Virtual Local Area Network tag (VLAN tagging; IEEE 802.1Q); and/or by 3) encapsulating the packet using Generic Routing Encapsulation (GRE; RFCs 1701, 1702, 2784, 2890), where the source and destination address of the GRE tunnel encapsulating the packet may be the same as the source and destination address of the unmodified data packet to keep the same path across the forwarding network 108.

The modification of the matched data packet may be at any location along the data structure of the matched data packet (e.g., prepending a header, appending a tag), and includes adding a packet identifier to the matched data packet. The modification may vary depending upon the type of transport network that exists between the ingress and egress NEs. For example, if the transport network operates at layer 2 (link layer), then the modification may add additional information (e.g., the packet identifier) between the layer 2 and layer 3 headers of the matched data packet.

The packet identifier may be a component of the modification method. For example, if the matched data packet is encapsulated using GRE, the GRE sequence number may be used as a component of the packet identifier.

The packet identifier may also include a path identifier. In some embodiments, the network controller 116 stores a map of the various NEs in the SDN, and can determine how a packet with a certain destination address and with other characteristics (e.g., class-of-service classification) traverses through the network. The network controller 116 configures the ingress NE to modify a matched data packet with a path identifier that uniquely identifies the path that the network controller 116 has determined that the matched data packet will take in the SDN.

The packet identifier may also include a packet sequence number to uniquely identify a matched data packet. The selection of a sequence number may be based upon the path identifier assigned to the matched data packet. In some embodiments, instead of having a separate packet sequence number and a path identifier, the packet identifier includes an identifier that combines the packet sequence number and the path identifier into a single identifier.

In some embodiments, the matched data packet may further be modified with a checksum or CRC so that the integrity of the original packet can be verified when the packet identification is removed from the packet, or so that the packet identifier itself may be verified when the identifier is later read by an egress NE. This checksum may be generated by hardware on the ingress NE.

At transaction 1, data packet 120 arrives at ingress NE 104 from an external network element (e.g., network element 102). This data packet matches one or more of the classification rules that the network controller 116 has configured for ingress NE 104. Since data packet 120 matches one or more of the classification rules that network controller 116 has configured for ingress NE 104, ingress NE 104 modifies the data packet 120 at transaction 2. This modification includes, but not limited to, modifying the data packet 120 to include a packet identifier and, in some embodiments, to also include a timestamp indicating when ingress NE 104 received data packet 120. NE 104 can perform various other modifications to the data packet 120 using mechanisms similar to those described above.

In some embodiments, at transaction 3, in response to the data packet 120 matching one or more of the classification rules, ingress NE 104 sends a notification message 122 to the network controller 116. This notification message may include a timestamp indicating when ingress NE 104 received data packet 120.

At transaction 4, ingress NE 104 sends the modified data packet 120, now referred to as tagged data packet 124, to the downstream NE in the forwarding network 108 according to the forwarding rules that network controller 116 has configured in ingress NE 104. This configuration may include specific forwarding rules for these tagged data packets, or may include generic forwarding rules for all packets with the same destination address as the destination address indicated in the tagged data packet 124.

At transaction 5, the tagged data packet 124 has passed through the forwarding network 108 along a particular network path. The forwarding network 108 represents one or more other NEs in the software defined network (SDN) that may be similar to the ingress NE 104 and egress NE 112 in functionality, and that are in between the ingress NE 104 and egress NE 112 along the path that the tagged data packet 124 takes in the SDN. The NEs represented in the forwarding network 108 may forward tagged data packet 124 based on stored forwarding rules that the network controller 116 has configured for all packets that have the same destination address as the destination address in the tagged data packet 124, or may forward the tagged data packet 124 according to specific forwarding rules configured specifically for tagged data packets, or may forward the tagged data packet 124 according to rules programmed by traditional protocols, such as Spanning Tree, Border Gateway Protocol (BGP) or Open Shortest Path First (OSPF) protocol.

Although the depicted system 100 only shows a single ingress NE and a single egress NE, the network may include multiple ingress and egress NEs (i.e., multiple paths entering and exiting the SDN). In this depicted network of FIG. 1, the forwarding rules of the NEs in forwarding network 108 cause the tagged data packet 124 to arrive at egress NE 112.

The network controller 116 has also configured egress NE 112 with one or more classification rules. These rules may be similar to those rules configured for ingress NE 104. The network controller 116 configures egress NE 112 to remove the modifications from a tagged data packet that matches the one or more classification rules. The network controller 116 further configures the egress NE 112 to send a notification message to the network controller 116 that includes the packet identifier from the tagged data packet and a timestamp indicating when the egress NE 112 received the tagged data packet.

In some embodiments, the network controller 116, using a stored network map of the SDN, determines that other egress NEs may also encounter tagged data packets. The network controller 116 configures these other egress NEs with classification rules as well and configures them to remove any modifications from tagged data packets and send a notification message to the network controller 116 as well.

In some embodiments, the network controller 116 configures an egress NE to remove all tags from any modified data packets that the egress NE receives and to send a notification message to the network controller upon receiving such a tagged data packet.

At transaction 6, egress NE 112 determines that the received tagged data packet 124 matches one or more classification rules that the network controller 116 has configured for egress NE 112. In response to such a determination, the egress NE 112 removes the modifications from tagged data packet 124 so that tagged data packet 124 reverts to the unmodified data packet 120.

At transaction 7, egress NE 112 sends the unmodified data packet 120 to the next downstream network element (e.g., network element 114) according to the forwarding rules stored in egress NE 112.

At transaction 8, the egress NE 112 sends a notification message 126 to the network controller 116. In one embodiment, this notification message 126 includes a timestamp indicating when the egress NE 112 received the matching tagged data packet 124. The notification message 126 also includes the packet identifier that was included in the tagged data packet 124. In some embodiments, the notification message 126 also includes the timestamp indicating when ingress NE 104 received data packet 120 (as part of transaction 1). In these embodiments, the timestamp indicating when ingress NE 104 received data packet 120 is included in tagged data packet 124. In some embodiments, before sending the notification message 126, egress NE 112 verifies a checksum in tagged data packet 124 to verify that the information in tagged data packet 124 has not been tampered with or has not been corrupted.

Once network controller 116 receives the notification message 126, and the notification 122 in some embodiments, the network controller 116 can determine the delay between the ingress NE 104 and the egress NE 112 for the particular data packet 120. In some embodiments the packet identifier that is included in tagged data packet 124 and sent to the network controller in 116 includes a path identifier that uniquely identifies the path that the tagged data packet 124 took through the SDN. In some embodiments the network controller 116 can determine the path that the tagged data packet 124 took through the SDN as the network controller 116 stores the configuration information and forwarding rules that the network controller 116 sent to the NEs in the SDN. In some embodiments the network controller 116 can determine the path that the tagged data packet 124 took through the SDN because the network controller 116 specifically configured the NEs in the SDN to forward the tagged data packet 124 along a certain path.

The network controller 116 can then determine the delay for the tagged data packet 124 along the particular path that the tagged data packet 124 took through the network by calculating the difference between the timestamp indicating when the egress NE 112 received the tagged data packet 124 and the timestamp indicating when the ingress NE 104 received the data packet 120. These timestamps are received by the network controller 116 in notification message 122 and notification message 126 or by notification message 126 alone if ingress NE 104 was not configured by the network controller 116 to send a notification message 122.

The network controller 116 may calculate the delay for various paths in the network by modifying data packets that traverse these various paths according to the methods described above and receiving notification messages from an egress NE at the end of each path. Based on these calculations of the delay for each path, the network controller 116 can adjust the forwarding rules or other performance configurations of the network accordingly. For example, if the network controller 116 determines the current traffic through a particular path in the SDN is congested, the network controller 116 can configure the NEs on that path to route traffic along a different path. As another example, the network controller 116 may send an alert to a network administrator upon detecting that delay along a path exceeds a certain threshold.

In some embodiments, the network controller receives a timestamp from ingress NE 104 indicating when ingress NE 104 sent the data packet 124. In these embodiments, the network controller can calculate the delay between the timestamp indicating when ingress NE 104 sent data packet 124 and when egress NE 112 received data packet 124.

In some embodiments, the NE 112 calculates the delay for a data packet 124. In such embodiments, egress NE 112 receives the timestamp from ingress NE indicating when ingress NE 104 received data packet 120 in data packet 124. Egress NE 112 uses this information and the time egress NE 112 received tagged data packet 124 to calculate the delay for data packet 124 through the SDN from ingress NE 104 to egress NE 112. Once egress NE 112 calculates this delay, it sends the delay information to network controller 116 including the packet identifier.

The types of measurements, calculations, and actions taken as a result of these measurements and calculations are not limited to those described here. The network controller 116, in some embodiments, may be able to perform additional measurements based on the timestamp information received and react to those measurements in additional ways (e.g., keep a historical record of times of high delay).

In some embodiments, the NEs in the network are time-synchronized in order to provide accurate timestamps. In some embodiments the time on the NEs is synchronized via the Precision Time Protocol (IEEE 1588).

Figure 2:
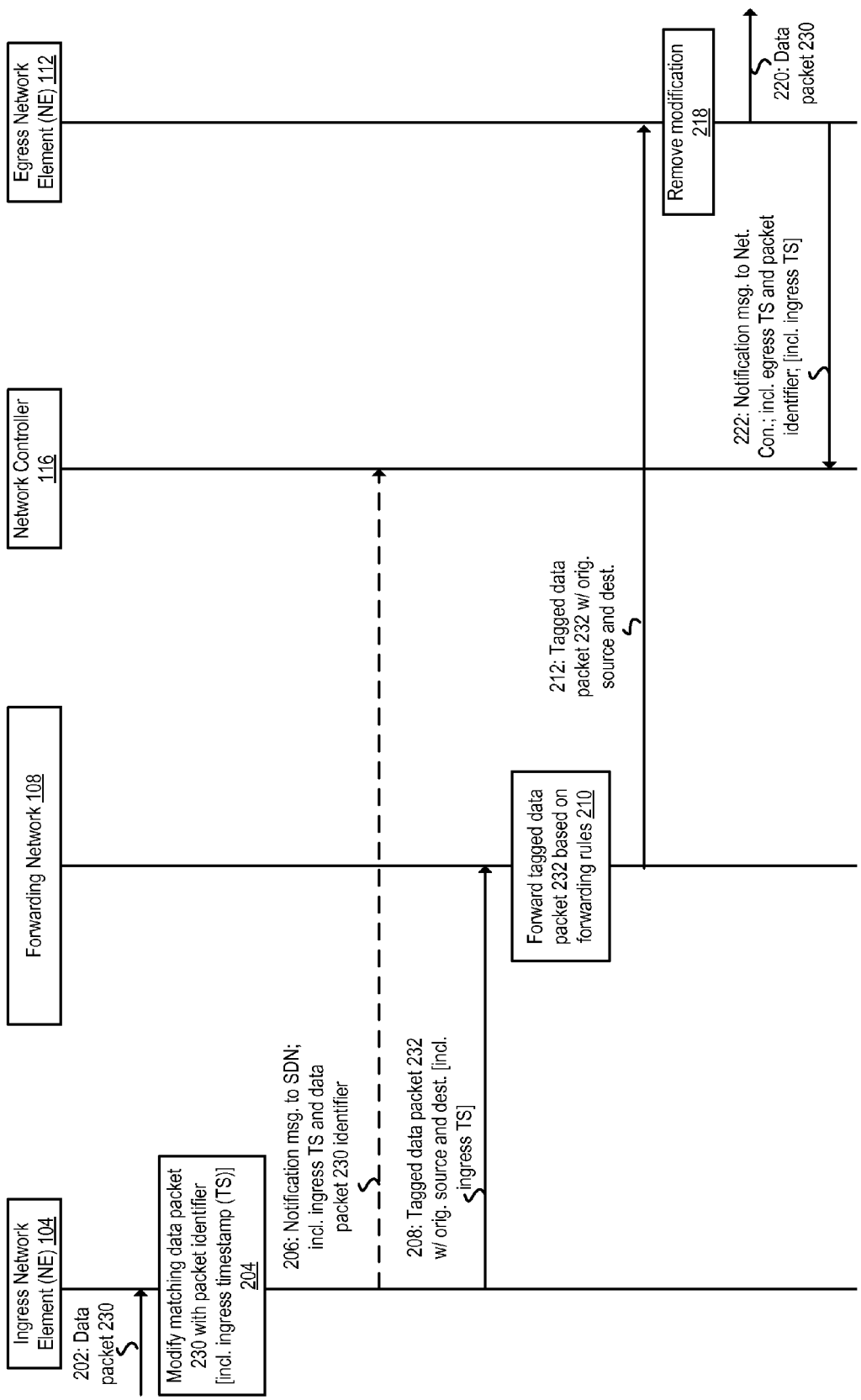
FIG. 2 is a network transaction diagram illustrating the flow of messages in a system 100 according to an embodiment of the invention.

FIG. 2 is a network transaction diagram illustrating the flow of messages according to an embodiment of the invention. The diagram in FIG. 2 reflects the elements described in system 100 in FIG. 1.

At transaction 202, data packet 230 arrives at ingress NE 104.

At transaction 204, ingress NE 104 modifies the matching data packet 230 to include a packet identifier, and to include, in some embodiments, a timestamp indicating when the data packet 230 was received by ingress NE 104.

In some embodiments, at transaction 206, ingress NE 104 sends a notification message to the network controller 116 that includes the timestamp indicating when the data packet 230 was received by ingress NE 104 and a packet identifier for data packet 230. As described, this packet identifier may include a path identifier identifying the path that the data packet takes through the SDN, and may also include a sequence number or other identifier identifying the packet itself.

At transaction 208, the ingress NE 104 sends the modified data packet 230, now referred to as tagged data packet 232, to the downstream NE in the forwarding network 108 according to forwarding rules stored in ingress NE 104. The tagged data packet 232 may include the same original source and destination addresses of the original unmodified data packet 230. In some embodiments tagged data packet 232 also includes a timestamp indicating when the data packet 230 was received by ingress NE 104.

At transaction 210, the forwarding network 108, which represents one or more NEs in the network in between ingress NE 104 and egress NE 112, forwards the tagged data packet 232 based on forwarding rules within the one or more NEs of the forwarding network 108.

At transaction 212, one of the NEs in forwarding network 108 sends tagged data packet 232 to egress NE 112.

At transaction 218, egress NE 112 determines that tagged data packet 232 matches one or more classification rules according to the methods described in reference to FIG. 1. Egress NE 112 then removes the modifications from tagged data packet 232 and forwards the unmodified data packet 230 to the next downstream network element at transaction 220.

At transaction 222, egress NE 112 sends a notification message to the network controller including a timestamp indicating when the egress NE 112 received tagged data packet 232, the packet identifier included in tagged data packet 232, and in some embodiments, an ingress timestamp indicating when ingress NE 104 received data packet 230 (this ingress timestamp was included in tagged data packet 232).

After receiving the notification message identified in transaction 222, the network controller 116 may calculate one or more network performance measurements and take any necessary actions in response to these measurements. The measurements and actions that the network controller 116 may perform are described with reference to FIG. 1.

Figure 3:
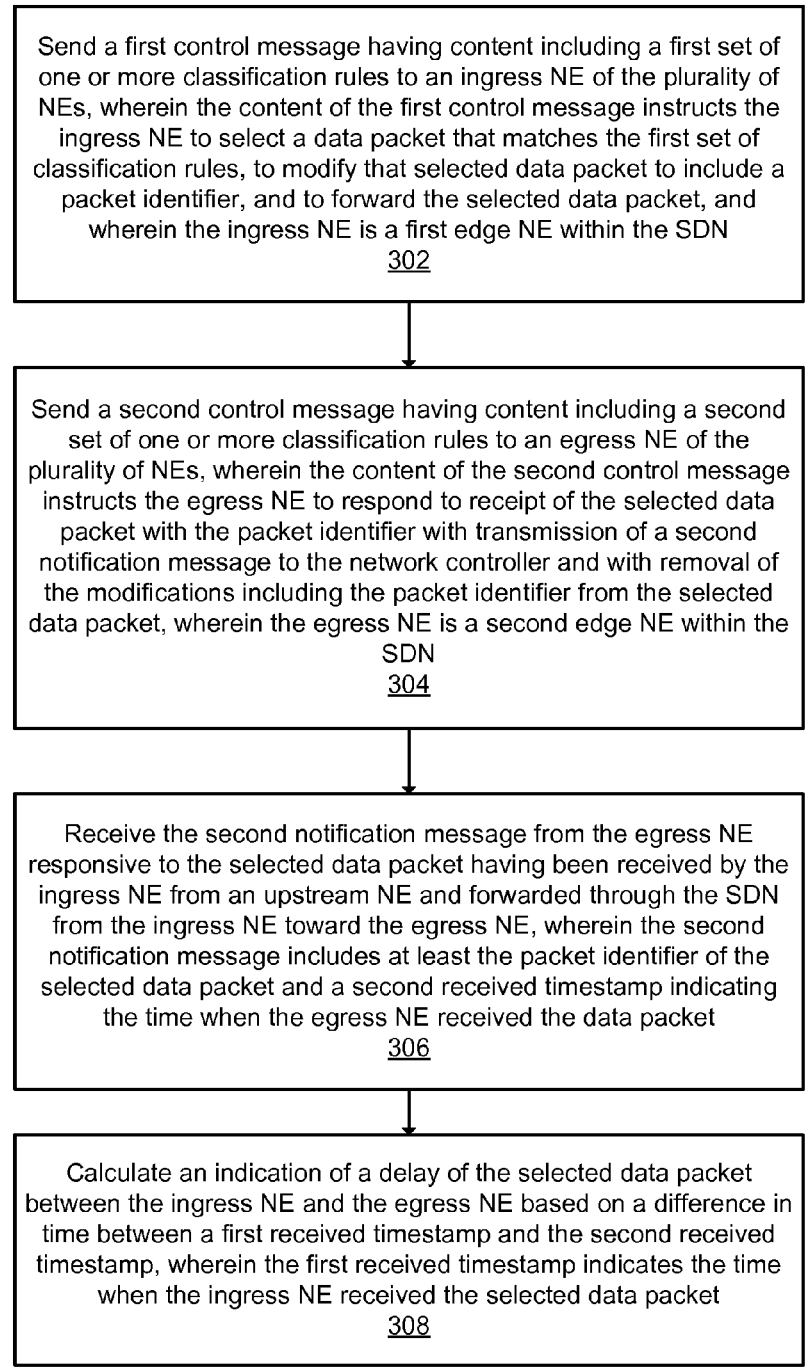
FIG. 3 is a flow diagram illustrating a method 300 for data path performance measurement using network traffic in a software defined network according to an embodiment of the invention.

FIG. 3 is a flow diagram illustrating a method 300 for data path performance measurement using network traffic in a software defined network according to an embodiment of the invention. For example, method 300 can be performed by the network controller 116. Method 300 may be implemented in software, firmware, hardware, or any combination thereof.

At 302, a network controller sends a first control message having content including a first set of one or more classification rules to an ingress NE of the plurality of NEs, wherein the content of the first control message instructs the ingress NE to select a data packet that matches the first set of classification rules, to modify that selected data packet to include a packet identifier, and to forward the selected data packet, and wherein the ingress NE is a first edge NE within the SDN. In some embodiments, ingress NE is NE 104.

In some embodiments, the first control message sent to the ingress NE further causes the ingress NE to transmit a first notification message having the packet identifier and the first received timestamp to the network controller. In some embodiments, this first notification message is notification message 122.

In some embodiments, the first control message sent to the ingress NE further causes the ingress NE to modify the selected data packet to include the first received timestamp, and wherein the second control message transmitted to the egress NE further causes the egress NE to include the first received timestamp in the second notification message.

In some embodiments, the first set of classification rules are based on learned traffic patterns. In some embodiments, the first set of classification rules specify a rate at which to select incoming data packets. In some embodiments, the packet identifier includes a path identifier that identifies the path that the selected data packet takes through the SDN. In some embodiments, the packet identifier includes a packet sequence number to uniquely identify the selected data packet. In some embodiments, the modification of the data packet does not affect the path the selected data packet takes through the SDN.

In some embodiments, the modification of the selected data packet includes encapsulating the selected data packet in a tunnel, wherein a first tunnel end point is the source address identified in the selected data packet, and wherein a second tunnel end point is the destination address identified in the selected data packet.

At 304, the network controller sends a second control message having content including a second set of one or more classification rules to an egress NE of the plurality of NEs, wherein the content of the second control message instructs the egress NE to respond to receipt of the selected data packet with the packet identifier with transmission of a second notification message to the network controller and with removal of the modifications including the packet identifier from the selected data packet, wherein the egress NE is a second edge NE within the SDN.

In some embodiments, egress NE is NE 112. In some embodiments, the second set of classification rules specify criteria by which the egress NE uses to recognize the selected data packet.

At 306, the network controller receives the second notification message from the egress NE responsive to the selected data packet having been received by the ingress NE from an upstream NE and forwarded through the SDN from the ingress NE toward the egress NE, wherein the second notification message includes at least the packet identifier of the selected data packet and a second received timestamp indicating the time when the egress NE received the data packet. In some embodiments, this notification message is notification message 126. In some embodiments, the selected data packet is data packet 120.

At 308, the network controller calculates an indication of a delay of the selected data packet between the ingress NE and the egress NE based on a difference in time between a first received timestamp and the second received timestamp, wherein the first received timestamp indicates the time when the ingress NE received the selected data packet.

The operations in this flow diagram have been described with reference to the exemplary embodiments of the other figures. However, it should be understood that the operations of this flow diagram can be performed by embodiments of the invention other than those discussed with reference to the other figures, and the embodiments of the invention discussed with reference to these other figures can perform operations different than those discussed with reference to the flow diagrams.

Figures 4A, 4B:
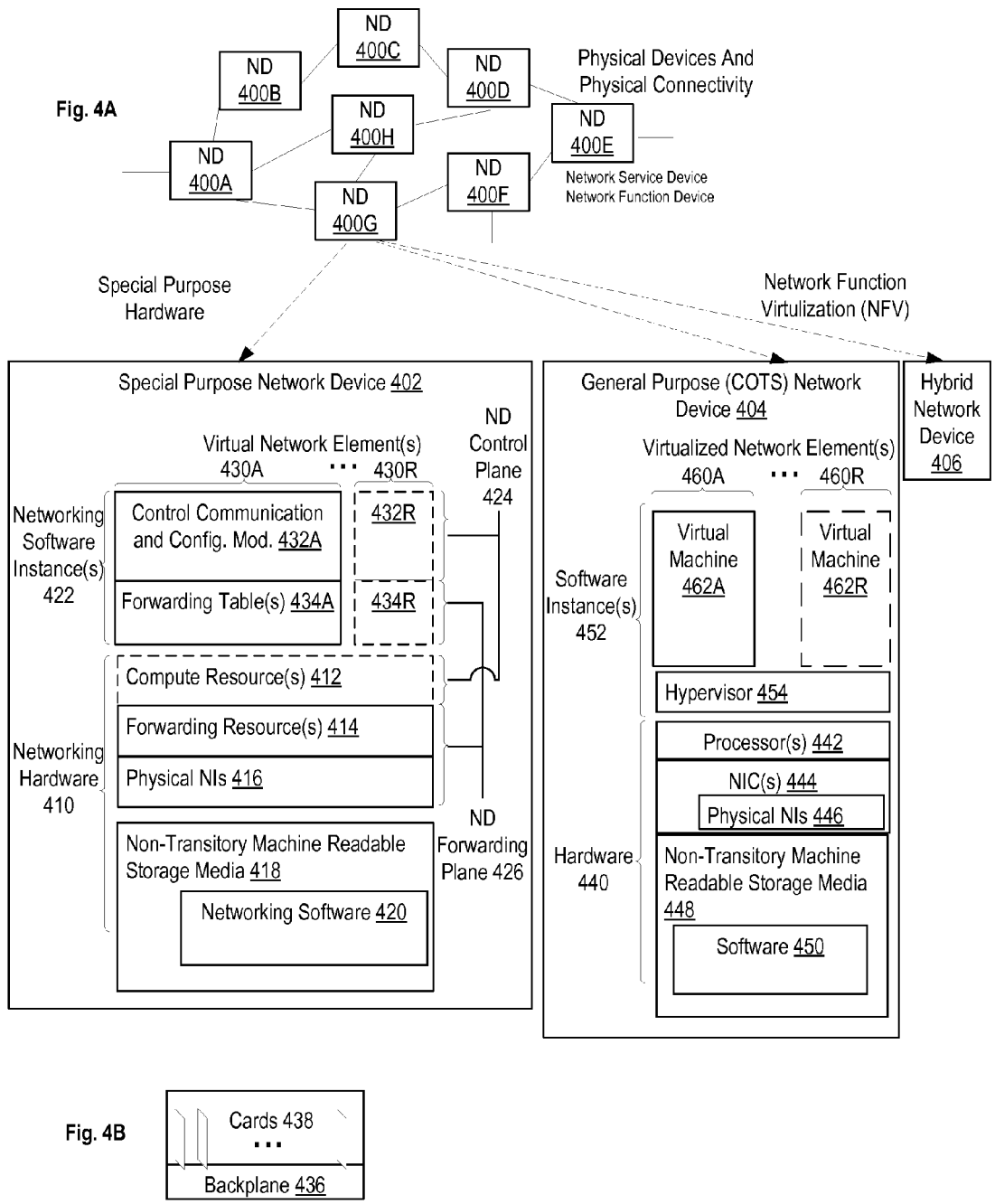
FIG. 4A illustrates connectivity between network devices (NDs) within an exemplary network, as well as three exemplary implementations of the NDs, according to some embodiments of the invention.
FIG. 4B illustrates an exemplary way to implement the special-purpose network device 402 according to some embodiments of the invention.

FIG. 4A illustrates connectivity between network devices (NDs) within an exemplary network, as well as three exemplary implementations of the NDs, according to some embodiments of the invention. FIG. 4A shows NDs 400A-H, and their connectivity by way of a lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 400A, E, and F illustrates that these NDs act as ingress and egress points for the network (and thus, these NDs are sometimes referred to as edge NDs; while the other NDs may be called core NDs).

Two of the exemplary ND implementations in FIG. 4A are: 1) a special-purpose network device 402 that uses custom application-specific integrated-circuits (ASICs) and a proprietary operating system (OS); and 2) a general purpose network device 404 that uses common off-the-shelf (COTS) processors and a standard OS.

The special-purpose network device 402 includes networking hardware 410 comprising compute resource(s) 412 (which typically include a set of one or more processors), forwarding resource(s) 414 (which typically include one or more ASICs and/or network processors), and physical network interfaces (NIs) 416 (sometimes called physical ports), as well as non-transitory machine readable storage media 418 having stored therein networking software 420. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 400A-H. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNEs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

In some embodiments, each of the virtual network elements 430A-R performs the functionality of a network element as described with reference to FIGS. 1-2.

The special-purpose network device 402 is often physically and/or logically considered to include: 1) optionally, a ND control plane 424 (sometimes referred to as a control plane) comprising the compute resource(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the compute resource(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

FIG. 4B illustrates an exemplary way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). In some embodiments, ND 402 does not include a control card. These cards are coupled together through one or more interconnect mechanisms illustrated as backplane 436 (e.g., a first full mesh coupling the line cards and a second full mesh coupling all of the cards). Returning to FIG. 4A, the general purpose network device 404 includes hardware 440 comprising a set of one or more processor(s) 442 (which are often COTS processors) and network interface controller(s) 444 (NICs; also known as network interface cards) (which include physical NIs 446), as well as non-transitory machine readable storage media 448 having stored therein software 450. During operation, the processor(s) 442 execute the software 450 to instantiate a hypervisor 454 (sometimes referred to as a virtual machine monitor (VMM)) and one or more virtual machines 462A-R that are run by the hypervisor 454, which are collectively referred to as software instance(s) 452. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 462A-R, and that part of the hardware 440 that executes that virtual machine (be it hardware dedicated to that virtual machine and/or time slices of hardware temporally shared by that virtual machine with others of the virtual machine(s) 462A-R), forms a separate virtual network element(s) 460A-R.

In some embodiments, a virtual network element 460 performs the functionality of a network element as described with reference to FIGS. 1-2.

The virtual network element(s) 460A-R perform similar functionality to the virtual network element(s) 430A-R. For instance, the hypervisor 454 may present a virtual operating platform that appears like networking hardware 410 to virtual machine 462A, and the virtual machine 462A may be used to implement functionality similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 462A-R differently. For example, while embodiments of the invention are illustrated with each virtual machine 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 454 includes a virtual switch that provides similar forwarding services as a physical Ethernet switch. Specifically, this virtual switch forwards traffic between virtual machines and the NIC(s) 444, as well as optionally between the virtual machines 462A-R; in addition, this virtual switch may enforce network isolation between the VNEs 460A-R that by policy are not permitted to communicate with each other (e.g., by honoring virtual local area networks (VLANs)). The third exemplary ND implementation in FIG. 4A is a hybrid network device 406, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 430A-R, VNEs 460A-R, and those in the hybrid network device 406) receives data on the physical NIs (e.g., 416, 446) and forwards that data out the appropriate ones of the physical NIs (e.g., 416, 446). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 4C illustrates a network with a single network element on each of the NDs of FIG. 4A, and within this straight forward approach contrasts a traditional distributed approach (commonly used by traditional routers) with a centralized approach for maintaining reachability and forwarding information (also called network control), according to some embodiments of the invention. Specifically, FIG. 4C illustrates network elements (NEs) 470A-H with the same connectivity as the NDs 400A-H of FIG. 4A.

FIG. 4C illustrates a centralized approach 474 (also known as software defined networking (SDN)) that decouples the system that makes decisions about where traffic is sent from the underlying systems that forwards traffic to the selected destination. In some embodiments, this centralized approach is used for the SDN as described with reference to FIGS. 1-2. The illustrated centralized approach 474 has the responsibility for the generation of reachability and forwarding information in a centralized control plane 476 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 476 has a south bound interface 482 with a data plane 480 (sometime referred to the infrastructure layer, network forwarding plane, or forwarding plane (which should not be confused with a ND forwarding plane)) that includes the NEs 470A-H (sometimes referred to as switches, forwarding elements, data plane elements, or nodes). The centralized control plane 476 includes a network controller 478, which includes a centralized reachability and forwarding information module 479 that determines the reachability within the network and distributes the forwarding information to the NEs 470A-H of the data plane 480 over the south bound interface 482 (which may use the OpenFlow protocol). Thus, the network intelligence is centralized in the centralized control plane 476 executing on electronic devices that are typically separate from the NDs. In some embodiments, network controller 478 includes the functionality of the network controller 116 as described with reference to FIGS. 1-2.

For example, where the special-purpose network device 402 is used in the data plane 480, each of the control communication and configuration module(s) 432A-R of the ND control plane 424 typically include a control agent that provides the VNE side of the south bound interface 482. In this case, the ND control plane 424 (the compute resource(s) 412 executing the control communication and configuration module(s) 432A-R) performs its responsibility for participating in controlling how data (e.g., packets) is to be routed (e.g., the next hop for the data and the outgoing physical NI for that data) through the control agent communicating with the centralized control plane 476 to receive the forwarding information (and in some cases, the reachability information) from the centralized reachability and forwarding information module 479 (it should be understood that in some embodiments of the invention, the control communication and configuration module(s) 432A-R, in addition to communicating with the centralized control plane 476, may also play some role in determining reachability and/or calculating forwarding information—albeit less so than in the case of a distributed approach; such embodiments are generally considered to fall under the centralized approach 474, but may also be considered a hybrid approach).

While the above example uses the special-purpose network device 402, the same centralized approach 474 can be implemented with the general purpose network device 404 (e.g., each of the VNE 4A60A-R performs its responsibility for controlling how data (e.g., packets) is to be routed (e.g., the next hop for the data and the outgoing physical NI for that data) by communicating with the centralized control plane 476 to receive the forwarding information (and in some cases, the reachability information) from the centralized reachability and forwarding information module 479; it should be understood that in some embodiments of the invention, the VNEs 4A60A-R, in addition to communicating with the centralized control plane 476, may also play some role in determining reachability and/or calculating forwarding information—albeit less so than in the case of a distributed approach) and the hybrid network device 406. In fact, the use of SDN techniques can enhance the NFV techniques typically used in the general purpose network device 404 or hybrid network device 406 implementations as NFV is able to support SDN by providing an infrastructure upon which the SDN software can be run, and NFV and SDN both aim to make use of commodity server hardware and physical switches.

FIG. 4C also shows that the centralized control plane 476 has a north bound interface 484 to an application layer 486, in which resides application(s) 488. The centralized control plane 476 has the ability to form virtual networks 492 (sometimes referred to as a logical forwarding plane, network services, or overlay networks (with the NEs 470A-H of the data plane 480 being the underlay network)) for the application(s) 488. Thus, the centralized control plane 476 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 4C illustrates the simple case where each of the NDs 400A-H implements a single NE 470A-H, it should be understood that the network control approaches described with reference to FIG. 4C also work for networks where one or more of the NDs 400A-H implement multiple VNEs (e.g., VNEs 430A-R, VNEs 460A-R, those in the hybrid network device 406). Alternatively or in addition, the network controller 478 may also emulate the implementation of multiple VNEs in a single ND. Specifically, instead of (or in addition to) implementing multiple VNEs in a single ND, the network controller 478 may present the implementation of a VNE/NE in a single ND as multiple VNEs in the virtual networks 492 (all in the same one of the virtual network(s) 492, each in different ones of the virtual network(s) 492, or some combination). For example, the network controller 478 may cause an ND to implement a single VNE (a NE) in the underlay network, and then logically divide up the resources of that NE within the centralized control plane 476 to present different VNEs in the virtual network(s) 492 (where these different VNEs in the overlay networks are sharing the resources of the single VNE/NE implementation on the ND in the underlay network).

While some embodiments of the invention implement the centralized control plane 476 as a single entity (e.g., a single instance of software running on a single electronic device), alternative embodiments may spread the functionality across multiple entities for redundancy and/or scalability purposes (e.g., multiple instances of software running on different electronic devices).

Figure 5:
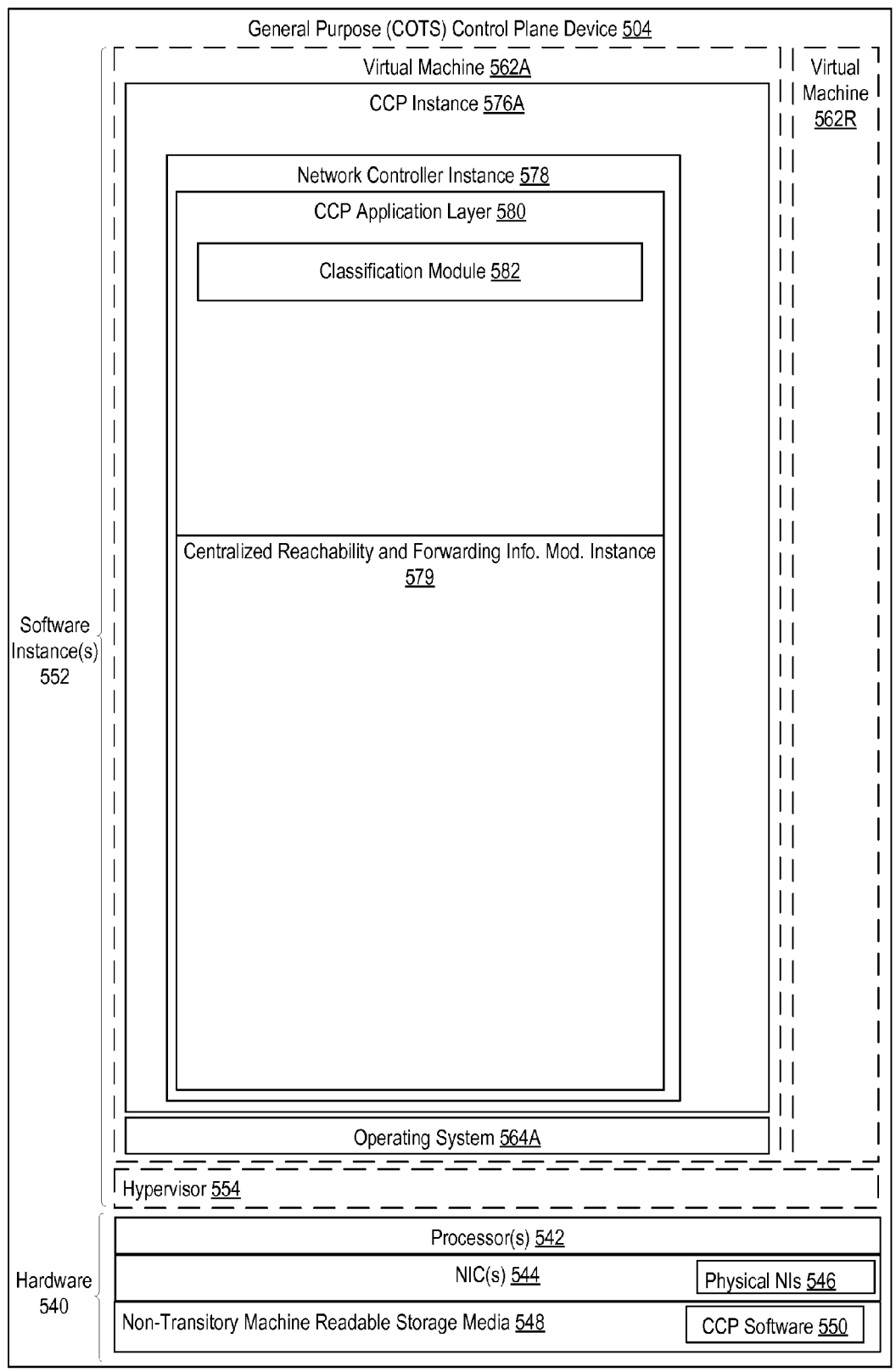
FIG. 5 illustrates a general purpose control plane device 504 including hardware 540 comprising a set of one or more processor(s) 542 (which are often Commercial off-the-shelf (COTS) processors) and network interface controller(s) 544 (NICs; also known as network interface cards) (which include physical NIs 546), as well as non-transitory machine readable storage media 548 having stored therein centralized control plane (CCP) software 550), according to some embodiments of the invention.

Similar to the network device implementations, the electronic device(s) running the centralized control plane 476, and thus the network controller 478 including the centralized reachability and forwarding information module 479, may be implemented a variety of ways (e.g., a special purpose device, a general-purpose (e.g., COTS) device, or hybrid device). These electronic device(s) would similarly include compute resource(s), a set of one or more physical NICs, and a non-transitory machine-readable storage medium having stored thereon the centralized control plane software. For instance, FIG. 5 illustrates, a general purpose control plane device 504 including hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein centralized control plane (CCP) software 550.

In embodiments that use compute virtualization, the processor(s) 542 typically execute software to instantiate a hypervisor 554 (sometimes referred to as a virtual machine monitor (VMM)) and one or more virtual machines 562A-R that are run by the hypervisor 554; which are collectively referred to as software instance(s) 552. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 550 (illustrated as CCP instance 576A) on top of an operating system 564A are typically executed within the virtual machine 562A. In embodiments where compute virtualization is not used, the CCP instance 576A on top of operating system 564A is executed on the "bare metal" general purpose control plane device 504.

The operating system 564A provides basic processing, input/output (I/O), and networking capabilities. In some embodiments, the CCP instance 576A includes a network controller instance 578. The network controller instance 578 includes a centralized reachability and forwarding information module instance 579 (which is a middleware layer providing the context of the network controller 478 to the operating system 564A and communicating with the various NEs), and an CCP application layer 580 (sometimes referred to as an application layer) over the middleware layer (providing the intelligence required for various network operations such as protocols, network situational awareness, and user—interfaces). At a more abstract level, this CCP application layer 580 within the centralized control plane 476 works with virtual network view(s) (logical view(s) of the network) and the middleware layer provides the conversion from the virtual networks to the physical view.

In some embodiments, network controller instance 578 includes the functionality of the network controller 116 as described with reference to FIGS. 1-2.

The centralized control plane 476 transmits relevant messages to the data plane 480 based on CCP application layer 580 calculations and middleware layer mapping for each flow. A flow may be defined as a set of packets whose headers match a given pattern of bits; in this sense, traditional IP forwarding is also flow-based forwarding where the flows defined by the destination IP address for example; however, in other implementations the given pattern of bits used for a flow definition may include more fields (e.g., 10 or more) in the packet headers. Different NDs/NEs/VNEs of the data plane 480 may receive different messages, and thus different forwarding information. The data plane 480 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

In some embodiments, CCP application layer 580 includes a classification module 581 that includes the functionality of the network controller 116 to configure the NEs with classification rules as described with reference to FIGS. 1-2.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address). Header parsing may also describe how to interpret a packet based on a set of protocol independent fields defined by their offset in the packet and value.

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 480, the packet (or a subset of the packet header and content) is typically forwarded to the centralized control plane 476. The centralized control plane 476 will then program forwarding table entries into the data plane 480 to accommodate packets belonging to the flow of the unknown packet. Once a specific forwarding table entry has been programmed into the data plane 480 by the centralized control plane 476, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a network controller of a control plane in a software defined network (SDN) coupled to a plurality of network elements (NEs) of a data plane in the SDN, comprising:
    sending a first control message having content including a first set of one or more classification rules to an ingress NE of the plurality of NEs, wherein the content of the first control message instructs the ingress NE to select a data packet that matches the first set of classification rules, to modify that selected data packet to include a packet identifier, and to forward the modified data packet, and wherein the ingress NE is a first edge NE within the SDN;
    sending a second control message having content including a second set of one or more classification rules to an egress NE of the plurality of NEs, wherein the content of the second control message instructs the egress NE to respond to receipt of the modified data packet with the packet identifier with transmission of a second notification message to the network controller and with removal of the modifications including the packet identifier from the modified data packet, wherein the egress NE is a second edge NE within the SDN;
    receiving the second notification message from the egress NE responsive to the modified data packet having been received by the ingress NE from an upstream NE and forwarded through the SDN from the ingress NE toward the egress NE on a path, wherein the second notification message includes at least the packet identifier of the modified data packet and a second received timestamp indicating the time when the egress NE received the modified data packet;
    calculating an indication of a delay of the modified data packet between the ingress NE and the egress NE based on a difference in time between a first received timestamp and the second received timestamp, wherein the first received timestamp indicates the time when the ingress NE received the data packet, and wherein the first received timestamp was sent to the network controller from either the ingress NE or the egress NE; and
    based in part upon the calculated indication of the delay, configuring one or more of the plurality of NEs to forward another data packet that also matches the first set of classification rules on another path that is different than the path to thereby cause congestion of the path to be reduced.

2. The method of claim 1, wherein the first control message sent to the ingress NE further causes the ingress NE to transmit a first notification message having the packet identifier and the first received timestamp to the network controller.

3. The method of claim 1, wherein the first control message sent to the ingress NE further causes the ingress NE to modify the selected data packet to include the first received timestamp, and wherein the second control message transmitted to the egress NE further causes the egress NE to include the first received timestamp in the second notification message.

4. The method of claim 1, wherein the first set of classification rules are based on one or more learned traffic patterns.

5. The method of claim 1, wherein the first set of classification rules specify a rate at which to select packets.

6. The method of claim 1, wherein the second set of classification rules specify criteria by which the egress NE uses to recognize the modified data packet.

7. The method of claim 1, wherein the packet identifier includes a path identifier that identifies the path that the modified data packet takes through the SDN.

8. The method of claim 1, wherein the packet identifier includes a packet sequence number to uniquely identify the modified data packet.

9. The method of claim 1, wherein the modification of the data packet does not affect the path the modified data packet takes through the SDN.

10. The method of claim 1, wherein the modification of the selected data packet includes encapsulating the modified data packet in a tunnel, wherein a first tunnel end point is the source address identified in the selected data packet, and wherein a second tunnel end point is the destination address identified in the selected data packet.

11. A network controller of a control plane in a software defined network (SDN) coupled to a plurality of network elements (NEs) of a data plane in the SDN, comprising:
    a processor and a memory, said memory containing instructions executable by the processor whereby the network controller is configured to:
    send a first control message having content including a first set of one or more classification rules to an ingress NE of the plurality of NEs, wherein the content of the first control message instructs the ingress NE to select a data packet that matches the first set of classification rules, to modify that selected data packet to include a packet identifier, and to forward the modified data packet, and wherein the ingress NE is a first edge NE within the SDN;
    send a second control message having content including a second set of one or more classification rules to an egress NE of the plurality of NEs, wherein the content of the second control message instructs the egress NE to respond to receipt of the modified data packet with the packet identifier with transmission of a second notification message to the network controller and with removal of the modifications including the packet identifier from the modified data packet, wherein the egress NE is a second edge NE within the SDN;
    receive the second notification message from the egress NE responsive to the modified data packet having been received by the ingress NE from an upstream NE and forwarded through the SDN from the ingress NE toward the egress NE, wherein the second notification message includes at least the packet identifier of the modified data packet and a second received timestamp indicating the time when the egress NE received the modified data packet;
    calculate an indication of a delay of the modified data packet between the ingress NE and the egress NE based on a difference in time between a first received timestamp and the second received timestamp, wherein the first received timestamp indicates the time when the ingress NE received the data packet, and wherein the first received timestamp was sent to the network controller from either the ingress NE or the egress NE; and based in part upon the calculated indication of the delay, configure one or more of the plurality of NEs to forward another data packet that also matches the first set of classification rules on another path that is different than the path to thereby cause congestion of the path to be reduced.

12. The network controller of claim 11, wherein the first control message sent to the ingress NE further causes the ingress NE to transmit a first notification message having the packet identifier and the first received timestamp to the network controller.

13. The network controller of claim 11, wherein the first control message sent to the ingress NE further causes the ingress NE to modify the selected data packet to include the first received timestamp, and wherein the second control message transmitted to the egress NE further causes the egress NE to include the first received timestamp in the second notification message.

14. The network controller of claim 11, wherein the first set of classification rules are based on one or more learned traffic patterns.

15. The network controller of claim 11, wherein the first set of classification rules specify a rate at which to select packets.

16. The network controller of claim 11, wherein the second set of classification rules specify criteria by which the egress NE uses to recognize the data packet.

17. The network controller of claim 11, wherein the packet identifier includes a path identifier that identifies the path that the modified data packet takes through the SDN.

18. The network controller of claim 11, wherein the packet identifier includes a packet sequence number to uniquely identify the modified data packet.

19. The network controller of claim 11, wherein the modification of the data packet does not affect the path the modified data packet takes through the SDN.

20. The network controller of claim 11, wherein the modification of the selected data packet includes encapsulating the modified data packet in a tunnel, wherein a first tunnel end point is the source address identified in the selected data packet, and wherein a second tunnel end point is the destination address identified in the selected data packet.

21. A non-transitory computer-readable storage medium having instructions stored therein, wherein the instructions, when executed by a processor of a network controller of a control plane in a software defined network (SDN) coupled to a plurality of network elements (NEs) of a data plane in the SDN, cause the processor to perform operations comprising:

sending a first control message having content including a first set of one or more classification rules to an ingress NE of the plurality of NEs, wherein the content of the first control message instructs the ingress NE to select a data packet that matches the first set of classification rules, to modify that selected data packet to include a packet identifier, and to forward the modified data packet, and wherein the ingress NE is a first edge NE within the SDN;

sending a second control message having content including a second set of one or more classification rules to an egress NE of the plurality of NEs, wherein the content of the second control message instructs the egress NE to respond to receipt of the modified data packet with the packet identifier with transmission of a second notification message to the network controller and with removal of the modifications including the packet identifier from the modified data packet, wherein the egress NE is a second edge NE within the SDN;

receiving the second notification message from the egress NE responsive to the modified data packet having been received by the ingress NE from an upstream NE and forwarded through the SDN from the ingress NE toward the egress NE, wherein the second notification message includes at least the packet identifier of the modified data packet and a second received timestamp indicating the time when the egress NE received the modified data packet;

calculating an indication of a delay of the modified data packet between the ingress NE and the egress NE based on a difference in time between a first received timestamp and the second received timestamp, wherein the first received timestamp indicates the time when the ingress NE received the data packet, and wherein the first received timestamp was sent to the network controller from either the ingress NE or the egress NE;

based in part upon the calculated indication of the delay, configuring one or more of the plurality of NEs to forward another data packet that also matches the first set of classification rules on another path that is different than the path to thereby cause congestion of the path to be reduced.

22. The non-transitory computer-readable storage medium of claim 21, wherein the first control message sent to the ingress NE further causes the ingress NE to transmit a first notification message having the packet identifier and the first received timestamp to the network controller.

23. The non-transitory computer-readable storage medium of claim 21, wherein the first control message sent to the ingress NE further causes the ingress NE to modify the selected data packet to include the first received timestamp, and wherein the second control message transmitted to the egress NE further causes the egress NE to include the first received timestamp in the second notification message.

24. The non-transitory computer-readable storage medium of claim 21, wherein the first set of classification rules are based on one or more learned traffic patterns.

25. The non-transitory computer-readable storage medium of claim 21, wherein the first set of classification rules specify a rate at which to select packets.

26. The non-transitory computer-readable storage medium of claim 21, wherein the second set of classification rules specify criteria by which the egress NE uses to recognize the modified data packet.

27. The non-transitory computer-readable storage medium of claim 21, wherein the packet identifier includes a path identifier that identifies the path that the modified data packet takes through the SDN.

28. The non-transitory computer-readable storage medium of claim 21, wherein the packet identifier includes a packet sequence number to uniquely identify the modified data packet.

29. The non-transitory computer-readable storage medium of claim 21, wherein the modification of the data packet does not affect the path the modified data packet takes through the SDN.

30. The non-transitory computer-readable storage medium of claim 21, wherein the modification of the selected data packet includes encapsulating the modified data packet in a tunnel, wherein a first tunnel end point is the source address identified in the selected data packet, and wherein a second tunnel end point is the destination address identified in the selected data packet.

* * * * *